United States Patent
Kloos et al.

(10) Patent No.: US 7,135,858 B2
(45) Date of Patent: Nov. 14, 2006

(54) SYSTEM WITH DISTANCE SENSOR FOR MEASURING ROTATIONAL SPEED OF A BODY

(75) Inventors: Gerold Kloos, Weingarten (DE); Robert Stoll, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 120 days.

(21) Appl. No.: 10/645,386

(22) Filed: Aug. 21, 2003

(65) Prior Publication Data

US 2004/0155649 A1    Aug. 12, 2004

(30) Foreign Application Priority Data

Sep. 4, 2002   (DE) ............................... 102 40 705

(51) Int. Cl.
*G01B 7/30* (2006.01)
*G01B 11/26* (2006.01)
(52) U.S. Cl. ............................ 324/207.25; 324/207.2; 324/207.15; 324/207.21; 324/173; 356/138
(58) Field of Classification Search ........ 324/160–167, 324/173–175, 2, 207.15, 207.19, 207.21, 324/207.25, 179; 356/138
See application file for complete search history.

(56) References Cited

U.S. PATENT DOCUMENTS

| | | | | |
|---|---|---|---|---|
| 5,432,442 A * | 7/1995 | Andersen | .................... | 324/174 |
| 5,539,308 A * | 7/1996 | Teramae et al. | ............ | 324/173 |
| 5,977,764 A * | 11/1999 | Riedle et al. | ................ | 324/165 |
| 6,100,682 A * | 8/2000 | Schroeder | .............. | 324/207.21 |
| 6,181,127 B1 * | 1/2001 | Wallrafen | .................... | 324/166 |
| 6,215,297 B1 * | 4/2001 | Bleckmann et al. | ........ | 324/166 |
| 6,417,662 B1 * | 7/2002 | Wallrafen | .................... | 324/174 |
| 2001/0009367 A1 * | 7/2001 | Seitzer et al. | ........... | 324/207.21 |
| 2002/0171416 A1 * | 11/2002 | Schroeder | .............. | 324/207.21 |
| 2003/0001563 A1 * | 1/2003 | Turner | ........................ | 324/165 |

FOREIGN PATENT DOCUMENTS

| | | |
|---|---|---|
| DE | 32 01 811 A1 | 9/1983 |
| DE | 38 29 390 A1 | 3/1990 |
| DE | 34 21 845 C2 | 2/1993 |
| DE | 195 15 338 A1 | 10/1996 |
| DE | 198 19 783 A1 | 11/1998 |
| DE | 197 54 819 C1 | 7/1999 |
| DE | 199 27 759 A1 | 1/2001 |
| JP | 06-82465 | 3/1994 |

* cited by examiner

*Primary Examiner*—Edward Lefkowitz
*Assistant Examiner*—David M. Schindler
(74) *Attorney, Agent, or Firm*—Davis & Bujold, P.L.L.C.

(57) ABSTRACT

A speed measuring system comprising at least one stationary speed sensor (4) for detecting a speed of a measuring body (1) rotating relative to the speed sensor (4) wherein the measuring body (1) is provided, on its periphery, with electric or magnetic discontinuities. The speed sensor (4) situated at a defined distance from the measuring body (1), reacts to the discontinuities when the measuring body (1) is moved past the speed sensor (4). The speed measuring system has, in addition, one separate distance sensor (5) for determining an actual distance (LS) and an actual change in distance between the speed sensor (4) and the measuring body (1). In an evaluation device of the speed measuring system the speed of the measuring body (1) is formed from an actual output signal of the speed sensor (4) according to an actual output signal of the distance sensor (5).

20 Claims, 2 Drawing Sheets

SYSTEM WITH DISTANCE SENSOR FOR MEASURING ROTATIONAL SPEED OF A BODY

FIELD OF THE INVENTION

The invention relates to speed measuring system comprising at least one speed sensor to detect the speed of a measuring body.

BACK GROUND OF THE INVENTION

Devices for measuring speed of a rotating measuring body are widely known. To this end, the rotating measuring body is usually provided on its periphery with electric or magnetic discontinuities, for example, with magnetic and non-magnetic sections, or sections of good and poor electric conductivity or as a toothed disc with teeth and gaps. The stationary speed sensor situated at a defined distance from the measuring body reacts to said discontinuities situated in the direction of motion when measuring body is moved past the speed sensor.

Already known speed sensors work, for example, as passive sensors according to the inductive measuring principle or as active sensors according to the Hall measuring principle or the magnetic-resistive measuring principle. In an inductive sensor where a toothed disc is moved past an inductive coil, the induced signal, as already known, depends both on the rotating velocity of the toothed disc or on the distance between the inductive sensor and the toothed disc. In a Hall sensor which reacts to magnetic discontinuities, the amplitude of the sensor signal is known to be independent of the velocity of motion of the measuring body, but dependent on the distance between speed sensor and measuring body.

To detect speeds near zero and to detect a direction of rotation of the measuring body, measuring systems are also already known in which two speed sensors working according to the same measuring principle are disposed immediately next to each other so that both speed sensors can detect the electric or magnetic discontinuities of the measuring body independently of each other. To determine the direction of rotation, the measuring system usually evaluates a phase displacement between the two measured sensor signals. Such a speed sensor with two Hall elements has been described in DE 195 15 338 A1, for example.

DE 38 29 390 A1 has disclosed a device for measuring speed in which the speed value issued for improving the quality of the signal is determined in the lower speed range by evaluating distance information between the speed sensor and the measuring body instead of by evaluating the frequency signal of the speed sensor. For said purpose, the measuring body is constructed so that the distance to the stationary speed sensor constantly changes periodically, for example, sinusoidally or saw-toothed shaped, which results in a change in the distance signal delivered by the speed sensor. A rear-mounted evaluation unit calculates a differential per time unit of said distance signal, that is, the edge steepness of the distance signal. Below a certain limiting frequency of the sensor signal, the edge steepness of the distance signal reflects the actual speed of the measuring body. The evaluation unit accordingly issues the differential of the distance as a speed signal only below said limiting frequency but above the limiting frequency the known frequency-dependent signal of the speed sensor. The evaluation of the edge steepness of the constantly periodic distance signal delivers reliable values for generating speed information only when the measuring contour is extensively free of geometrically determined errors and also in the relevant speed range, at least to a great extent, no temporary distance changes exist, for example, as a result of unbalance or vertical oscillations of the measuring body.

From DE 34 21 845 C2 is known of a device for simultaneously determining unbalance of a rotating measuring body, particularly of a washing machine drum, by means of a speed sensor. The basis here is that an unbalance appearing on an elastically suspended rotating measuring body periodically changes the distance between the measuring body and the stationary speed sensor. The output signal of the speed sensor is accordingly modulated with a signal originating from the periodical change in distance. A demodulation of the temporary enveloping curve of the output signal of the speed sensor delivers a standard for the unbalance of the measuring body. Together with the unbalance measurement, the speed sensor can be simultaneously used for speed measuring. But the elastic suspension of the measuring body required for the intended use disclosed implies a great distance between speed sensor and measuring body with the attendant known limitations relative to measuring range and signal quality of the speed signal in the whole measuring range.

Since a decisive importance is accorded to the distance between the stationary speed sensor and the rotating measuring body with regard to signal quality, especially in motor vehicle units critical to safety like an anti-blocking system of a motor vehicle in DE 32 01 811 A1, it has been proposed to provide control of the signal amplitude and/or amplitude fluctuations dependent on the distance between measuring body and speed sensor. Hereby air gap changes can easily be detected that are periodic or exceed an admissible degree and the sensor distance can be mechanically readjusted before the standing out interruptions have reached an extent involving an adulteration of the measuring results of the speed sensor.

In all known speed sensors, the air gap between stationary speed sensor and the rotating measuring body due to the limited release thresholds of the speed sensor, that is, due to the preset limiting values of the speed signal amplitudes extending sinusoidally or rectangularly by unit of time, for example, has to be precisely adjusted for a utilizable speed signal in order that the speed sensor delivers altogether speed as an output signal. Especially in the case of strict requirements on the signal quality and a wide measuring range, a substantial importance is attached to maintaining the adjusted air gap.

In the practice, the problem can now appear that external interruptions in certain speed ranges result in that the air gap between speed sensor and measuring body, which had previously been precisely adjusted during the assembly, permanently or temporarily change during operation. Such a problem can be produced by a vibration, for example, especially vertical oscillation of the measuring body. In the extreme case, those undesired periodic changes in the air gap between speed sensor and measuring body, which are determined by vibrating or vertical oscillation, can result in a speed of the measuring body being affected even though the measuring body itself does not actually rotate. As a practical example of such a problem, it is mentioned that the output speed measurement of a motor vehicle transmission driven by a diesel engine at low velocity of the vehicle or when the vehicle is parked.

The problem on which the invention is based is to provide a sturdy measuring system for determining a speed of a rotating measuring body, on one hand, with a high signal quality within a large measuring range and, on the other, at least extensively insensitive to vertical oscillations of the measuring body during operation and torsion oscillations of the measuring body when parked.

The problem is solved with a speed measuring system having the features of claim 1. Advantageous designs and developments result from the sub-claims.

SUMMARY OF THE INVENTION

The invention is based on the knowledge that, on one hand, for evaluating signal amplitudes of a speed sensor having an actually large air gap between speed sensor and measuring body quantitatively low release thresholds are needed to form the speed signal, on the other hand, said quantitatively low release thresholds combined with an actually small air gap can result in erroneous interpretation of the speed sensor signal. As mentioned already, an actual change in air gap can occur as result of external interruptions. It has been found in tests that, specially at a low speeds and stoppage of the measuring body combined with an actually small air gap, a quantitatively comparatively high release threshold is needed for evaluating the signal amplitude in order to rule out such erroneous interpretation of the speed sensor signal with certainty. Besides, it has been found that at high speeds of the measuring body combined with an actually small air gap, a comparatively great actual speed signal amplitude exists so that quantitatively low release thresholds are not needed to form the speed signal in this operation range.

Departing from the known prior art, the speed measuring system has at least one speed sensor for detecting speed of a rotating measuring body. In a manner known per se, the rotating measuring body is provided on its periphery with electric or magnetic discontinuities, for example, with magnetic or non-magnetic sections or sections of good and poor electric conductivity or in the form of a toothed disc with teeth and gaps. The stationary speed sensor located at a defined distance from the measuring body reacts, in a manner known per se, to said discontinuities situated thereon in the direction of motion when the measuring body is moved past the speed sensor. As measuring principle for the speed sensor, all measuring methods where the speed signal amplitude depends on the air gap between speed sensor and measuring body, such as inductive or electroresistive, or Hall elements can be used.

It is proposed, according to the invention, that the speed measuring system has in addition to the speed sensor, a separate distance sensor by the output signal of which an actual distance between speed sensor and measuring body is determined. To this end, the separate distance sensor palpates a contour of the homogeneous surface nature of the measuring body, preferably without contact.

The distance sensor permanently delivers, for each operating point of the measuring body, an absolute distance or also a change in distance between measuring body and speed sensor. According to the invention, said distance information is constantly used to adapt the release thresholds of the speed sensor that are specific to the sensor to the actual air gap between measuring body and speed sensor. Those values of the signal amplitudes of the speed sensor (for example, sinusoidally or rectangularly extending), the amount of which has to be exceeded in order that the speed sensor delivers a utilizable speed output signal unequal to "zero" are to be understood here as release thresholds. In principle, by integrating an actual air gap measure value, the reaction sensitivity of the speed sensor is constantly adapted to the real environmental conditions of the speed measurement.

In relation to a radial scanning, that is, a measuring direction at least extensively vertical with the axis of rotation of the measuring body, such a contour can be a circular cylindrical section of a toothed disc, for example. In relation to axial scanning, that is, to a measuring direction at least extensively axial of the axis of rotation of the measuring body, such a contour can be an even front surface of a transmitter wheel, for example. The actual distance between the speed sensor and the measuring body can be measured, as known per se, inductively, magneto-resistively, optically or by means of Hall element.

The distance sensor and the speed sensor can advantageously be placed in a common housing whereby a speed measuring system of an utmost compact construction results.

In one other advantageous design of the invention, it is proposed that the speed measuring system has two speed sensors disposed directly adjacent one distance sensor. Both speed sensors here detect the electric or magnetic discontinuities of the measuring body independently of each other. By an adequately designed evaluation device, a phase offset between both speed sensor signals is taken into account so that the measuring system delivers speed and/or a direction of rotation and/or an angularity of the measuring body as output values. As described above, the evaluation of the actual distance signal of the distance sensor ensures that eventual oscillations of the air gap between speed sensor and measuring body is compensated with regard to the release threshold of the plottable speed signal amplitude. By virtue of this arrangement, a "zero" speed can also be reliably detected.

For measuring the speed, all measuring methods where the speed signal amplitudes depend on the air gap between speed sensor and measuring body, for example, inductive or magneto-resistive or Hall elements can be used.

In a favorable development of this other design, all three sensors can be placed in a common housing as a speed measuring system with a compact construction.

BRIEF DESCRIPTION OF THE DRAWINGS

The invention will now be described, by way of example, with reference to the accompanying drawings in which.

DETAILED DESCRIPTION OF THE INVENTION

Figure 3:
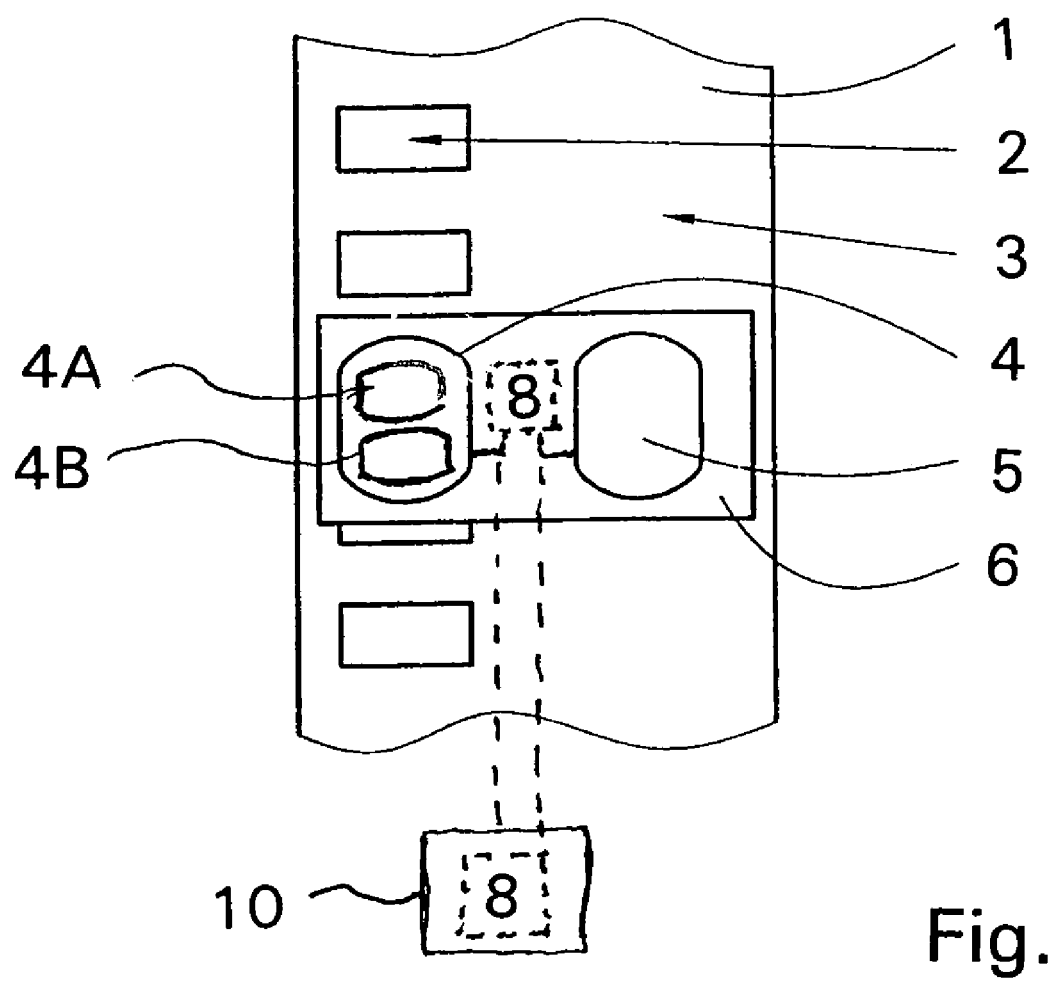
FIG. 3 is a top view of a measuring body of an inventive speed measuring system employing two speed sensors.

A stationary speed sensor 4 located radially to the toothed disc 1 in this embodiment conventionally detects, for example, inductive, magneto-resistive or via a Hall element, the pulse of the counter toothing 2 during a rotation of the measuring body and provides a speed output signal representing the motion of the counter toothing 2 and thus the rotation of the toothed disk 1. As discussed with respect to the prior art speed measuring systems, and although the speed sensor 4 is located at an initially selected distance from the toothed disc 1, the actual air gap distance between the speed sensor 4 and the toothed disc 1 will vary with time and with rotation of the toothed disc 1 and the variation in the air gap distance will effect the speed output signal of the speed sensor 4, thereby causing errors in the speed output signal. In another development, as illustrated in FIG. 3, the speed sensor 4 can be designed as double sensor 4A and 4B adjacently located along the direction of motion of the counter toothing 2, thus measuring the direction of rotation and/or angularity thereof, together with the speed of the transmitter wheel.

Axially next to the speed sensor 4 and radially above the cylindrical smooth distance measuring surface 3, a distance sensor 5 is located which scans, for example, according to the inductive or magneto-resistive measuring principle, said distance measuring surface 3. According to the invention, in this manner the distance sensor 5 continuously determines an actual air gap distance between speed sensor 4 and measuring body 1 and provides a distance output signal representing the actual air gap distance between the speed sensor 4 and the measuring body 1. In one other development, a change in the air gap distance between the speed sensor 4 and the measuring body 1 will appear as a change in the distance output signal and, instead of the actual air gap as represented by the distance output signal, a change in the actual air gap distance as represented by a change in the distance output signal can be used. The actual air gap or the change in the actual air gap a represented by the distance output signal or the change in the distance output signal forms, together with the output signal of the speed sensor 4, the input variables of an evaluation device 8 of the inventive speed measuring system. Said evaluation device 8 can be integrated in the speed sensor 4 or in the sensor housing 6, but also in a separate (decentered) control unit 10.

To achieve the most compact construction possible, speed sensor 4 and distance sensor 5 are situated together in one sensor housing 6 thus forming a sort of miniature speed measuring system.

In the evaluation device 8 of the speed measuring system, the output signal of the speed sensor 4 is evaluated, according to the actual air gap distance represented by the distance output signal of the distance sensor 5 to form an actual speed of the measuring body as represented by an output signal of the speed measuring system. The sensor-specific release thresholds of the speed sensor 4 are here of essential importance, as will be explained herebelow with the aid of FIG. 2.

Figure 1:
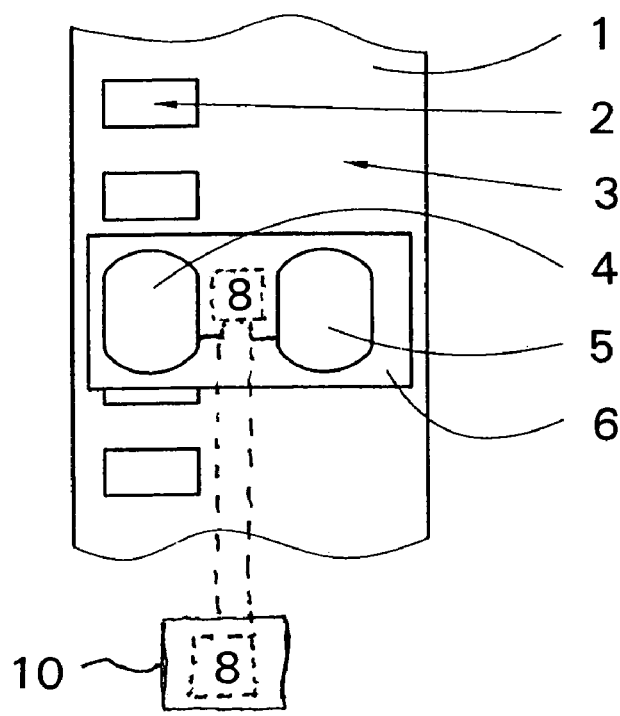
FIG. 1 is a top view of a measuring body with an inventive speed measuring system.
Figure 2:
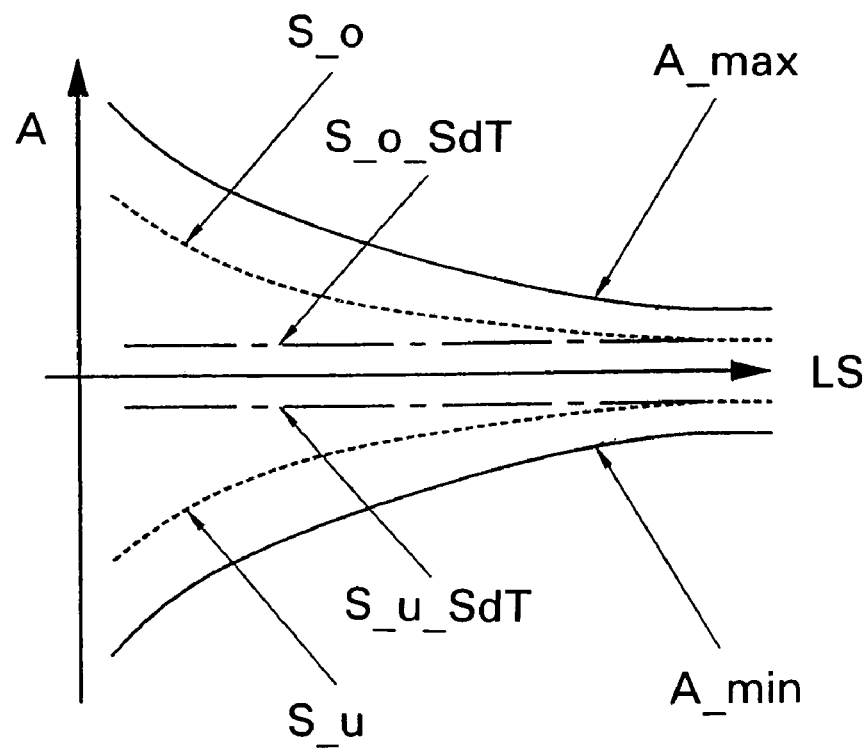
FIG. 2 is a diagrammatic curve of a speed signal amplitude as a function of an air gap.

In FIG. 2 a diagrammatic curve of the signal amplitudes (ordinate A) of the speed sensor 4 via the air gap (abscissa LS) between stationary speed sensor 4 and rotating measuring body 1 is shown. With A_max and A_min respectively, are designated the maximum and minimum speed signal amplitudes which can result from rotation of the measuring body 1. According to the invention, an upper release threshold S_o (shown in dotted line) and a lower release threshold S_u (shown in dotted line) are coordinated with the speed sensor 4. Both release thresholds S_o and S_u are a function of the measured air gap LS. If the actual measured speed signal amplitude is greater than the upper release threshold S_o or smaller than the lower release threshold S_u, the speed sensor 4 delivers a reliable speed signal unequal to "zero".

The upper and lower release thresholds S_o, S_u are stored in the evaluation device 8 of the inventive measuring system in the form of characteristic lines specific to the sensor and/or specific to the measuring body as a function of the air gap LS. If the speed sensor 4 now detects an actual movement of the measuring body, as represented by the speed output signal of the speed sensor 4, the movement represented by the speed output signal of the speed sensor 4 is corrected by the evaluation device 8 according to the characteristic line representing the actual air gap distance as represented by the distance output signal from the distance sensor 5 and is issued by the evaluation device 8 of the speed measuring system as an actual speed value of the measuring body 1 only when the required signal amplitude, based on the time-parallel measured air gap, has been quantitatively exceeded. Otherwise, the evaluation device of the speed measuring system issues a "zero" speed.

In another embodiment, the maximum and minimum speed signal amplitudes A_max, A_min can also be stored in the evaluation device of the speed measuring system in the form of characteristic lines specific to the sensor as a function of the air gap LS. In this embodiment the speed output signal from the speed sensor 4 is corrected by the evaluation device 8 according to the characteristic line representing the actual air gap distance as represented by the distance output signal from the distance sensor 5 and In this variant, the minimum value of the actual speed signal amplitude, dependent on the actual air gap LS, is taken into account, for example, as a differential value in relation to the limiting values A_max A_min of the speed signal amplitudes as a percent deviation from the limiting values A_max, A_min of the speed signal amplitudes. The actual speed signal amplitude can then be smaller at most by a defined differential amount or a defined percent deviation than the respective speed signal amplitudes A_max, A_min in order that the speed measuring system issues a speed value unequal to "zero".

In one other development of the invention, the release thresholds S_o, S_u or the limiting values A_max, A_min of the speed signal amplitudes dependent on the air gap LS can also be constructed as adaptable characteristic lines. Hereby it is possible to take into account, for example, the specific construction tolerance of the speed sensor 4 relative to the measuring body 1 or also to compensate for a permanent air gap change occurring during operation.

As can be understood from FIG. 2, the release thresholds S_o, S_u and also the maximum and minimum speed signal amplitudes A_max, A_min increase from the amount when the air gap LS becomes smaller. Compared to the known prior art, shown in the shaded range between the inventive upper release threshold S_o and the upper release thresholds S_o_SdT, according to the prior art, and between the inventive lower release threshold S_u and the lower release thresholds S_u_SdT, according to the prior art that errors in the measurement of the speed of the measuring body 1, such as can particularly be produced by vibrations of the measuring body 1, are prevented with certainty by the inventive air-gap dependent release thresholds S_o, S_u for issuance of a speed value unlike "zero".

The inventive speed measuring system is an utmost sturdy system for determining speed and/or direction of rotation and/or position of the rotating measuring body for any desired technical application. Compared to the prior art, the effectively static and dynamically utilizable air gap range is advantageously enlarged and accordingly the speed measuring system is insensitive with respect to outer interruptions like vibrations. The additional distance sensor notwithstanding, the inventive speed measuring system hardly needs more installation space than a transitional speed sensor. Another advantage results from the fact that a very precise adjustment of the distance between speed sensor and measuring body, can be omitted to a great extent with the corresponding saving in the production (tolerances of the connecting parts, whirling tolerances and maximum unbalance of the measuring body . . . ) and the assembly.

Eventually required secondary steps to prevent or at least reduce external interruptions (vibrations . . . ) acting upon the measuring body are spared.

REFERENCE NUMERALS 1 measuring body, transmitter wheel
2 counter toothing
3 distance measuring surface
4 speed sensor
5 distance sensor
6 sensor housing
A speed signal amplitude
A_max maximum speed signal amplitude
A_min minimum speed signal amplitude
LS distance between measuring body and speed sensor, air gap
S_o upper release threshold according to the invention
S_u lower release threshold according to the invention
S_o_SdT upper release threshold according to the prior art
S_u_SdT lower release threshold according to the prior art

The invention claimed is:

1. A speed measuring system for determining a speed of a measuring body rotating relative to a speed sensor, the speed measuring system comprising:
a plurality of one of electric and magnetic discontinuities located on a periphery of the rotating measuring body,
a distance measuring surface located on the periphery of the rotating measuring body, and
the speed sensor located at an air gap distance from the periphery of the rotating measuring body,
wherein the speed sensor is reactive to the plurality of one of electric and magnetic discontinuities, during rotation of the rotating measuring body, to provide a speed output signal representing rotation of the plurality of one of electric and magnetic discontinuities past the speed sensor and having an amplitude dependent upon an air gap distance between the speed sensor and the periphery of the rotating measuring body,
a distance sensor located next to the speed sensor for scanning the distance measuring surface and providing a distance output signal representing the air gap distance between the distance sensor and the distance measuring surface on the periphery of the rotating measuring body, and
an evaluation device for compensating for any variation in the air gap distance when the amplitude of the speed output signal is one of greater than an upper release threshold and smaller than a lower release threshold; and
the upper and the lower release thresholds are adjusted by the distance output signal so that the upper and the lower release thresholds are a function of the air gap distance.

2. The speed measuring system according to claim 1, wherein the evaluation device of the speed measuring system issues a speed unequal to a "zero" only when an amplitude of the speed output signal of the speed sensor is greater than the upper release threshold or smaller than the lower release threshold.

3. The speed measuring system according to claim 1, wherein a maximum speed output signal amplitude and a minimum speed output signal amplitude are respectively a function of an actual distance between the speed sensor and the rotating measuring body, and a change in the maximum speed output signal amplitude and the minimum speed output signal amplitude are respectively a function of the air gap distance between the speed sensor and the rotating measuring body, and the evaluation device of the speed measuring system issues a speed unequal to a "zero" value as an actual speed of the rotating measuring body only when an amplitude of the speed output signal of the speed sensor is smaller by one of a defined differential amount and a defined percent deviation of the maximum speed output signal amplitude or is larger by a defined differential amount of the minimum speed output signal amplitude.

4. The speed measuring system according to claim 1, wherein, as the air gap distance decreases, the upper and the lower release thresholds and maximum and minimum speed signal amplitudes increase.

5. The speed measuring system according to claim 1, wherein the distance sensor scans, without contact, a contour of the measuring body as the distance measuring surface.

6. The speed measuring system according to claim 1, wherein the speed sensor and the distance sensor are situated in a sensor housing.

7. The speed measuring system according to claim 1, wherein the speed measuring system has two speed sensors disposed immediately adjacent one another which detect one of the electric and the magnetic discontinuities of the rotating measuring body independently of one another, and the evaluation device takes into account a phase offset between both speed sensor signals so that the speed measuring system delivers, as an output at least one of the speed, a direction of rotation and an angularity of the rotating measuring body.

8. The speed measuring system according to claim 7, wherein the two speed sensors and the distance sensor are situated in a sensor housing.

9. The speed measuring system according to claim 2, wherein the upper and the lower release thresholds and maximum and minimum speed amplitudes are stored as sensor-specific characteristic lines in the evaluation device of the speed measuring system.

10. The speed measuring system according to claim 9, wherein the sensor-specific characteristic lines are adaptable according to the distance output signal and are a function of the air gap distance.

11. The speed measuring system according to claim 1, wherein the evaluation device of the speed measuring system is integrated in a sensor housing.

12. The speed measuring system according to claim 1, wherein the evaluation device of the speed measuring system is situated in a separate control unit.

13. The speed measuring system according to claim 1, wherein the distance sensor works according to one of an inductive measuring principle, a magnetic-resistive measuring principle, an optical measuring principle and a Hall measuring principle.

14. The speed measuring system according to claim 1 wherein the speed sensor works according to a measuring principle in which the speed output signal amplitude depends on the distance between the speed sensor and the rotating measuring body.

15. The speed measuring system according to claim 14, wherein the distance sensor works according to one of an inductive measuring principle, a magnetic-resistive measuring principle, an optical measuring principle and a Hall measuring principle.

16. A speed measuring system comprising:
at least one stationary speed sensor for detecting speed of a measuring body rotating relative to the at least one stationary speed sensor in which one of electric and magnetic discontinuities are provided on a periphery of the measuring body, and the speed sensor, located at defined distance from the measuring body, reacts to a direction of movement of the discontinuities situated on the measuring body as the measuring body is moved past the speed sensor by generating a speed output signal representing the movement of the measuring body past the speed sensor; and a distance sensor located at a predetermined location with respect to the speed sensor for determining an actual distance between the distance sensor and the measuring body and generating a distance output signal representing the actual distance between the distance sensor and the measuring body, the actual distance between the distance sensor and the measuring body representing an actual distance between the speed sensor and the measuring body and a change in the distance between the speed sensor and the measuring body representing a change in the distance between the distance sensor and the measuring body, and the distance output signal being constantly used to adapt release thresholds of the at least one stationary speed sensor relative to a change in an actual air gap between the measuring body and the speed sensor.

17. A speed measuring system for determining a speed of a measuring body rotating relative to a speed sensor comprising:

one of electric and magnetic discontinuities provided on a periphery of the measuring body,
the speed sensor being located at a defined distance from the measuring body and reacting to a direction of movement of the discontinuities situated on the measuring body as the measuring body is moved past the speed sensor to generate a speed output signal representing movement of the measuring body past the speed sensor, a distance sensor located at a predetermined location relative to the speed sensor for determining an actual distance between the distance sensor and the measuring body and generating a distance output signal representing an actual distance between the speed sensor and the measuring body wherein a change in the distance output signal represents a change in the actual distance between the speed sensor and the measuring body, and wherein an actual speed of the measuring body is determined from the speed output signal of the speed sensor evaluated according to the distance output signal of the distance sensor in an evaluation device of the speed measuring system to improve reaction sensitivity of the speed sensor; and wherein a maximum speed output signal amplitude specific to the speed sensor and a minimum speed output signal amplitude specific to the measuring body are respectively a function of the actual distance between the speed sensor and the measuring body, and a function of a change in actual distance between the speed sensor and the measuring body, and the evaluation device of the speed measuring system issues a speed unequal to a "zero" value as the actual speed of the measuring body only when a speed output signal amplitude of the speed sensor is smaller by one of a defined differential amount and a defined percent deviation of the maximum output speed signal amplitude or is larger by a defined differential amount of the minimum output speed signal amplitude.

18. The speed measuring system according to claim 17 wherein release thresholds (S_o, S_u) of the speed sensor (4) specific to at least one of the speed sensor and the measuring body are respectively function of the actual distance (LS) between the speed sensor (4) and the measuring body (1) and a function of an actual change in distance between the speed sensor (4) and the measuring body (1), the evaluation device of the speed measuring system issues a speed unequal to the "zero" value, as the actual speed of the measuring body (1), only when an actual speed signal amplitude of the speed sensor (4) is greater than an upper release threshold (S_o) or smaller than a lower release threshold (S_u).

19. The speed measuring system according to claim 18, wherein the actual distance between the speed sensor and the measuring body represents an air gap distance between the speed sensor and the measuring body and, when the air gap distance decreases, the upper and the lower release thresholds (S_o, S_u) and the maximum and the minimum speed signal amplitudes (A_max, A_min) increase.

20. The speed measuring system according to claim 18, wherein the upper and the lower release thresholds (S_o, S_u) and the maximum and the minimum speed amplitudes (A_max, A_min) are stored as specific characteristic lines in the device of the speed measuring system.

* * * * *